(No Model.)
C. P. STEINMETZ.
CONSTANT POTENTIAL ALTERNATING GENERATOR.
No. 568,464. Patented Sept. 29, 1896.
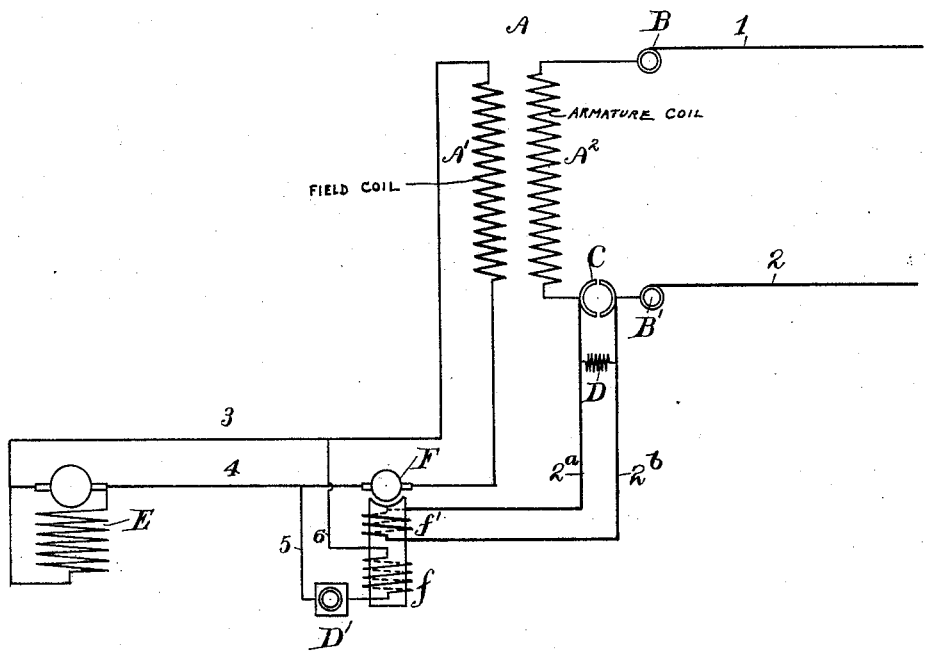
WITNESSES.
A. F. Macdonald.
J. J. Johnston.
INVENTOR.
Charles P. Steinmetz
by Geo. R. Blodgett,
atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

CONSTANT-POTENTIAL ALTERNATING GENERATOR.

SPECIFICATION forming part of Letters Patent No. 568,464, dated September 29, 1896.

Application filed April 30, 1894. Serial No. 509,455. (No model.)

*To all whom it may concern:*

Be it known that I, CHARLES P. STEINMETZ, a subject of the Emperor of Germany, residing at Schenectady, county of Schenectady, and State of New York, have invented certain new and useful Improvements in Dynamo-Electric Machines, of which the following is a specification.

My invention relates to dynamo-electric machines, and more particularly to the large generators used for alternating-current work, either for long-distance transmission or for central-station plants, and has for its object to provide a convenient means of compounding such generators, capable of easy regulation, and accurately providing for all loads to which the generating capacity of the machines is adapted.

To the ends pointed out I provide, as is usual with such machines, a separate exciter for its field-magnets, and I also provide a commutator in one of the series leads of the machine by which the current is rectified while passing around the field-magnet of a third machine, presently to be referred to. The third machine to which reference is made has also a winding upon its field-magnet in shunt across the mains from the exciter to the field-magnets of the large generator. The third machine is a counter-electromotive-force generator in series with the exciter. The arrangement indicated allows me to oppose the two electromotive forces to one another and get a very close and accurate compounding effect by varying their ratio, so that the electromotive force of the exciter is controlled by the resultant effect of the two opposing electromotive forces.

The accompanying drawing shows in diagram the arrangement just described.

A indicates diagrammatically the main generator, of which A' is the field-magnet winding, $A^2$ the armature-winding, B B' the collector-rings, and C the commutator in the lead to the collector-ring B'.

1 and 2 are the mains leading to the work.

E is the exciting-machine, shunt wound, as is customary, its armature being connected by the leads 3 4 to the field-magnet coil A' of the main machine.

F is the third machine already alluded to, its field-magnets being energized by a coil $f$ in shunt to the mains 3 4, through the leads 5 6, and having a regulating-resistance D' in circuit therewith. From the commutator C a series circuit to the main machine passes by the leads $2^a$ $2^b$ through the differential series winding $f'$ upon the field-magnet of the machine F, the armature of which is in series in the lead 4 between the main exciter E and the field-magnet of the main generator A'.

D is a resistance in shunt between the leads $2^a$ $2^b$, serving to prevent sparking at the commutator.

The operation of my improved method and means of compounding is as follows: During the normal working of the machine the counter electromotive force of the machine F is so proportioned to the direct electromotive force of the exciter E by means of the regulating-resistance D' that the field-magnet winding A' is sufficiently energized to maintain the potential of the current delivered by the armature $A^2$. When, however, the load increases, and with the load the current, and the drop of potential incident thereto takes place, the same increase of current increases the effect of the differential series winding $f'$, diminishing the counter electromotive force of the third machine F, thus allowing an increased excitation of the field-magnet A' and increasing the potential of the delivered current, while on a decrease of load in the main circuit the reverse of this operation takes place. I may also change this differentiation of the two forces so far as to make them assisting instead of opposing electromotive forces, as where the capacity of the machine would be so taxed that the differential winding $f'$ upon the field-magnet of the motor or counter-electromotive-force machine would become so highly energized as to reverse the polarity of the machine and thus cause it to generate additional electromotive force, acting to assist that of the exciter and still more highly energize the field-magnets of the main alternator. Such an arrangement, however, I do not contemplate employing in practice, unless for a few moments, when a sudden load is thrown upon the machine which it is not adapted to carry consecutively. Under such circumstances the regulation is not so effective and the machine varies somewhat in electromotive force and output.

Although I have described my improved method in its relation to an alternating-current machine, in which it is of greatest efficacy as compared with other systems, I do not intend to limit myself to its use in that relation only, but I intend to embrace in the scope of the claims continuous-current machinery, as this requires no modification in the principle of invention and no practical modification in the apparatus embodying the principle, the substitution of a commutator for a collecting-ring being an immaterial change in the practice of my invention.

I find a material advantage in the use of the special apparatus herein set out, inasmuch as the saturation-curve of the counter-electromotive-force machine modifies that of the field-magnets of the main generator, so that the current rises in potential slowly at first, and as the limit of load is reached, faster and faster, thus maintaining the proper electromotive force of the machine under its extreme capacity, whereas with ordinary means of exciting the characteristic rises most rapidly at about half-load and after that falls slightly.

What I claim as new, and desire to secure by Letters Patent of the United States, is—

1. The combination of a dynamo-electric generator, having its field excited by the resultant action of a main-exciter source, and a regulating-dynamo machine in series therewith, and a field-coil on the regulating-machine whose excitation is varied proportionally to the current flowing in the circuit of the main machine, as set forth.

2. The combination of an alternator, an exciter therefor and a regulating-dynamo in the exciter-circuit, whose field is energized by current from the exciter and by the commutated or rectified current of the alternator, as set forth.

3. The combination of an alternator, an exciter, a regulating-machine in the exciter-circuit, and a field-coil on the regulating-machine energized by the commutated or rectified current of the alternator, as set forth.

4. The combination with an alternating-current dynamo-electric machine, of a separate exciter and a counter-electromotive-force machine, having a differential series coil upon its field-magnets, the exciter and counter-electromotive-force machine being in the circuit with the field-magnet winding of the main machine; whereby the increase of current incident to additional load on the alternator acts to cut down the counter electromotive force, and vary the excitation of the field-magnets.

5. The combination of an alternating-current dynamo-electric machine, a separate exciter furnishing electromotive force for the field-magnets thereof, a counter-electromotive-force machine in the same field-magnet circuit, a differential series coil upon the field-magnet of the counter-electromotive-force machine, and a commutator in the lead from the main machine to the differential series coil; all arranged, as herein described and set out, to vary the effect of the counter-electromotive-force armature inversely to changes in the load.

In witness whereof I have hereunto set my hand this 28th day of April, 1894.

CHARLES P. STEINMETZ.

Witnesses:
T. J. JOHNSTON,
B. B. HULL.